United States Patent
Hattori et al.

[11] Patent Number: 5,578,248
[45] Date of Patent: Nov. 26, 1996

[54] COMPOSITION FOR USE IN A TRANSPARENT AND ELECTRICALLY CONDUCTIVE FILM AND A METHOD FOR MAKING THE FILM

[75] Inventors: Akiyoshi Hattori; Akihiko Yoshida; Atsushi Nishino, all of Osaka, Japan

[73] Assignee: Matsushita Electric Industrial Co., Ltd., Kadoma, Japan

[21] Appl. No.: 478,342

[22] Filed: Jun. 7, 1995

Related U.S. Application Data

[63] Continuation of Ser. No. 252,389, Jun. 1, 1994, abandoned, which is a continuation of Ser. No. 916,722, Jul. 22, 1992, abandoned.

[30] Foreign Application Priority Data

| Jul. 24, 1991 | [JP] | Japan | 3-184422 |
| Oct. 21, 1991 | [JP] | Japan | 3-272292 |
| Oct. 30, 1991 | [JP] | Japan | 3-284456 |
| Oct. 30, 1991 | [JP] | Japan | 3-284457 |
| Dec. 11, 1991 | [JP] | Japan | 3-327309 |

[51] Int. Cl.$^6$ .............................. H01B 1/00; H01B 1/08
[52] U.S. Cl. ............... 252/518; 252/521; 427/108; 427/126.1; 106/1.22; 106/1.25; 420/555; 423/624; 423/115
[58] Field of Search .................... 252/518, 521; 427/108, 126.1; 106/1.22, 1.25; 420/555; 423/624, 115

[56] References Cited

U.S. PATENT DOCUMENTS

| 4,252,841 | 2/1981 | Kinugawa et al. | 427/108 |
| 4,268,539 | 5/1981 | Nakayama et al. | 427/108 |
| 4,303,554 | 12/1981 | Sudo et al. | 427/108 |
| 4,369,208 | 1/1983 | Okunaka et al. | 427/108 |
| 4,391,743 | 7/1983 | Maeda et al. | 252/518 |
| 4,420,500 | 12/1983 | Nakatani et al. | 252/518 |
| 4,937,148 | 6/1990 | Sato et al. | 252/518 |

FOREIGN PATENT DOCUMENTS

| 0131827 | 1/1985 | European Pat. Off. . |
| 1116082 | 9/1989 | Japan . |
| 2056433 | 3/1981 | United Kingdom . |
| 2093442 | 9/1982 | United Kingdom . |

*Primary Examiner*—Paul Lieberman
*Assistant Examiner*—M. Kopec
*Attorney, Agent, or Firm*—McDermott, Will & Emery

[57] ABSTRACT

An object of the present invention is to provide a composition for use in a formation of transparent and electrically conductive film having a low electric resistance and a high transmittance and a method for making the film mentioned above. A mixture of inorganic indium compound and organic tin compound is combined with organic compound capable of coordinating with either of indium and tin to form an organic solution. When the mixture is heated, the inorganic indium compound and the organic tin compound coordinating partially with the organic compound react with water of crystallization of inorganic indium compound. The organic tin compound is partially subjected to hydrolysis to form an intermediate complex compound including indium and tin. This suppresses the evaporation of tin and generates a uniform film having a high transmittance and a low electric resistance. An addition of polyhydric alcohol increases the viscosity of the solution and gives a high stability to a resultant film obtained by applying the composition to the substrate and firing.

8 Claims, 4 Drawing Sheets

COMPOSITION FOR USE IN A TRANSPARENT AND ELECTRICALLY CONDUCTIVE FILM AND A METHOD FOR MAKING THE FILM

SPECIFICATION

This is a continuation application of application Ser. No. 08/252,389 filed Jun. 1, 1994 which was a 37 C.F.R. Specification § 1.62 FWC of Ser. No. 07/916,722 filed Jul. 22, 1992, both applications now abandoned.

BACKGROUND OF THE INVENTION

The present invention relates to a composition for use in a transparent and electrically conductive film and a method for making the film and more particularly to a composition for a transparent and electrically conductive film formed on a glass substrate or a ceramic substrate and a method for making the film.

Hitherto, an electrode material having a high transmittance for a visible light has been used in a display element such as a liquid crystal display and an electroluminesence display and in a heating resistor for preventing the window glass of a car, an air plane and building from collecting moisture or from freezing.

There has been known a transparent and electrically conductive material which usually consisted of antimony tin oxide(ATO) or indium tin oxide(ITO). These metal oxides can be applied to the glass substrate or a ceramic substrate for formation of a transparent and electrically conductive film.

The transparent and electrically conductive film can be formed by the following methods: (1) vacuum deposition method; (2) sputtering method; (3) CVD method; (4) screen printing method and (5) dipping method.

However, the above methods (1), (2) and (3) require a complicated equipment in a high cost and have a problem in the cost and the mass production. The methods (4) and (5) have a possibility to solve the problem due to the methods (1), (2) and (3), but have difficulty to form a film superior in the practical use.

For example, a use of organic solution of an inorganic compound such as indium nitrate, indium chloride or stannic chloride causes the formed film to generate a white spot or to have a weak mechanical strength which results in an easy scratching. There is a method to use an indium organic acid compound having a strong ion bonding such as indium octylate. Since the organic indium compound tends to be hydrolized and is relatively easy to be chemically changed, it is disadvantageous that the application method of liquid generates a gel state. Further, there is proposed another method to use an organic complex of indium or tin. In this method, an evaporation of tin compound during the heat treatment accompanied with thermal decomposition of the film applied to the glass substrate prevents the resultant film from forming a uniform structure. It is difficult for this method to obtain a uniform film having a low electric resistance.

SUMMARY OF THE INVENTION

In order to solve the problem mentioned above, an object of the present invention is to provide a composition capable of forming a transparent and electrically conductive film having a low electric resistance and a high transmittance without the evaporation of tin compound during the heat treatment and a method for making the film by use of the composition.

As a result of our intensive study, we found that if a composition to be applied on a substrate contains a tin compound in a complex form represented by the formula:

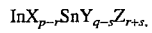
$$InX_{p-r}SnY_{q-s}Z_{r+s}.$$

the tin compound is not easy to evaporate during the heat treatment. Therefore, in a first aspect in order to achieve the object, the present invention is to provide a composition for use in a formation of a transparent and electrically conductive film, which comprises a composite compound represented by the formula:

$$InX_{p-r}SnY_{q-s}Z_{r+s}$$

wherein $InX_p$ is an inorganic indium salt, $SnY_q$ is an organic tin salt and Z is an organic compound capable of coordinating with indium and tin; p, q, r and s are coordination numbers.

In accordance with a composition for use in a formation of transparent and electrically conductive film, a mixture of inorganic indium compound and organic tin compound is combined with an organic compound capable of coordinating with both of indium and tin to form an organic solution. When the organic solution is heated, the inorganic indium compound and the organic tin compound coordinating partially with the organic compound react with water of crystallization of inorganic indium compound. The organic tin compound is partially hydrolyzed to form the intermediate complex compound including indium and tin as represented by the above formula. This suppresses the evaporation of tin or tin compound and provides a uniform film having a high transmittance and a low electric resistance.

Accordingly, in a further aspect of the present invention, there is provided a composition for use in a formation of a transparent and electrically conductive film, which is prepared by partial hydrolysis under heat treatment of an organic solution mainly containing an inorganic indium compound, an organic tin compound and an organic compound capable of coordinating with indium and tin.

In the organic solution, said organic tin salt is preferably mixed with said inorganic indium salt in a mixing ratio of 5 to 20 wt % by a definition of Sn/(Sn+In)×100%.

Further, it is preferred that said inorganic indium salt is selected from the group consisting of indium nitrate, indium sulfate and indium chloride. Also, it is preferred that said organic tin salt is selected from the group consisting of salts of a carboxylic acid and a dicarboxylic acid. Furthermore, it is preferred that said organic compound capable of coordinating with tin and indium is selected from the group consisting of β-diketone group, α- or β-ketone acid group, ester group of α- or β-ketone acid group and α or β-amino alcohol group.

An addition of polyhydric alcohol increases the viscosity of the organic solution and gives a high stability to a resultant film obtained by applying the solution to the substrate and firing. Accordingly, in a third aspect of the present invention, there is provided a composition for use in a formation of a transparent and electrically conductive film which further contains a polyhydric alcohol.

Since the composition for use in a formation of a transparent and electrically conductive film is fixed on the substrate, it is preferred that the composition further contains a catalyzer for thermal decomposition in order to promote a thermal decomposition. The catalyzer is preferably selected from the group consisting of a peroxide compound and a nitro compound. Preferred examples are hydrogen peroxide, tri-nitrotoluene and picric acid since these compounds having small carbon number tend to leave little residual carbon after the thermal decomposition thereof.

In a fourth aspect of the present invention, there is provided a method for making a transparent and electrically conductive film, which comprises steps of providing a composition for use in a formation of a transparent and electrically conductive film by heating an organic solution mainly comprising an inorganic indium salt, an organic tin salt and an organic compound capable of coordinating with indium and tin to carry out partial hydrolysis of said organic solution and, if necessary, thereafter adding a polyhydric alcohol and/or a catalyzer for thermal decomposition to the resultant organic solution; applying said composition to a substrate and after drying subjecting the substrate having said composition film applied thereto to a firing treatment.

In the method for making a transparent and electrically conductive film, it is preferred that the firing treatment is carried out in a temperature rising speed of 20° C./min. or more and under a pressurized atmosphere of steam in order to promote a hydrolysis reaction.

In order to carry out the method for making a transparent and electrically conductive film under a reducing atmosphere, it is necessary that the organic tin salt has an oxygen content of 22 at % or more. Even if the firing treatment is carried out under the reducing atmosphere, the organic compound capable of coordinating with both of indium and tin can evaporate before the thermal decomposition thereof and the inorganic indium compound and the organic tin compound can thermally decompose by means of their own oxygen, so that the oxygen defect amount becomes increased and thus the resulting film resistance can be lowered, comparing with that of a film formed by firing under a conventional oxygen atmosphere.

In the method for making a transparent and electrically conductive film in order to achieve a uniform heating the composition applied on the substrate to prevent a formation of semi-hardened or cracked skin layer on a surface of the film, it is preferred that the firing treatment is carried out by means of thermal decomposition due to a radiant heat under a semi-closed atmosphere. Such a thermal decomposition under the semi-closed atmosphere may be carried out in a room defined by walls made of metal, glass or ceramics material provided with small holes, whereby the atmosphere pressure can be self-controlled by means of a ratio B/A between (B) an amount of decomposed gas generated upon the thermal decomposition of the composition applied on the substrate and the (A) total area of the small holes for discharging the decomposed gas.

In an embodiment for carrying out the above method for making a transparent and electrically conductive film, an oven provided with the following design conditions can realize the best mode of the thermal decomposition:

(1) wherein the thermal decomposition under the semi-closed atmosphere is carried out in a room defined by walls, each of which temperature can be controlled independently in a manner to make a property of transparent and electrically conductive film formed on front and back surfaces of the substrate to be uniform.

(2) wherein the thermal decomposition under the semi-closed atmosphere is carried out by a direct heat from the walls or by a indirect heat in a semi-closed box heated by a receiving heat from the walls.

(3) wherein the pressure of the semi-closed atmosphere is from 5 to 100 mmH$_2$O when the thermal decomposition is going.

(4) wherein a ratio (V/A) between the room volume (V) of the semi-closed atmosphere and the total area (A) of the holes for discharging the decomposed gas is from 50 to 2000 cm$^3$/cm$^2$.

(5) wherein a ratio (B/A) between the amount (B) of the decomposed gas and the total area (A) of the holes for discharging the decomposed gas is from 100 to 10000 ml/cm$^3$.

(6) wherein a ratio (B/V) between the amount (B) of the decomposed gas and the room volume (V) of the semi-closed atmosphere is from 0.01 to 1000 ml/cm$^3$.

Meanwhile, according to the method of the present invention, there are provided various kinds of the transparent and electrically conductive films. Among them, as a result of our studying a relation between the average particle size and the electrical resistance or the visible light transmittance (at 550 nm), we found that the films which comprise oxide particles of indium and tin having a particle diameter of 30 to 100 nm are superior in the electrical resistance as shown in FIG.2, since a particle size of 100 nm or more makes a contact resistance between the particles to be large and thus results in a lower packing density. On the contrary, a particle size of 30 nm or less makes a film strength to be weak and thus makes a film resistance to be large.

Also, we found that the more uniform the avarage particle size becomes, the higher strength the film is provided with. Accordingly, the present invention is to provide a transparent and electrically conductive film, wherein 90% of the oxide particles is within a distribution of center particle size ±3σ, whereby the film comes to have a much lower resistance.

Further, as a result of studying the relation between the average particle size and the film thickness, we found that it is preferable that a ratio a/b between the average particle size (a) and the film thickness (b) is 0.7 or less, because the number of particles arranged in a series to a thickness direction of the film has the substantial influence on the film strength.

DETAILED DESCRIPTION OF THE PREFERRED EMBODIMENT

Figure 1:
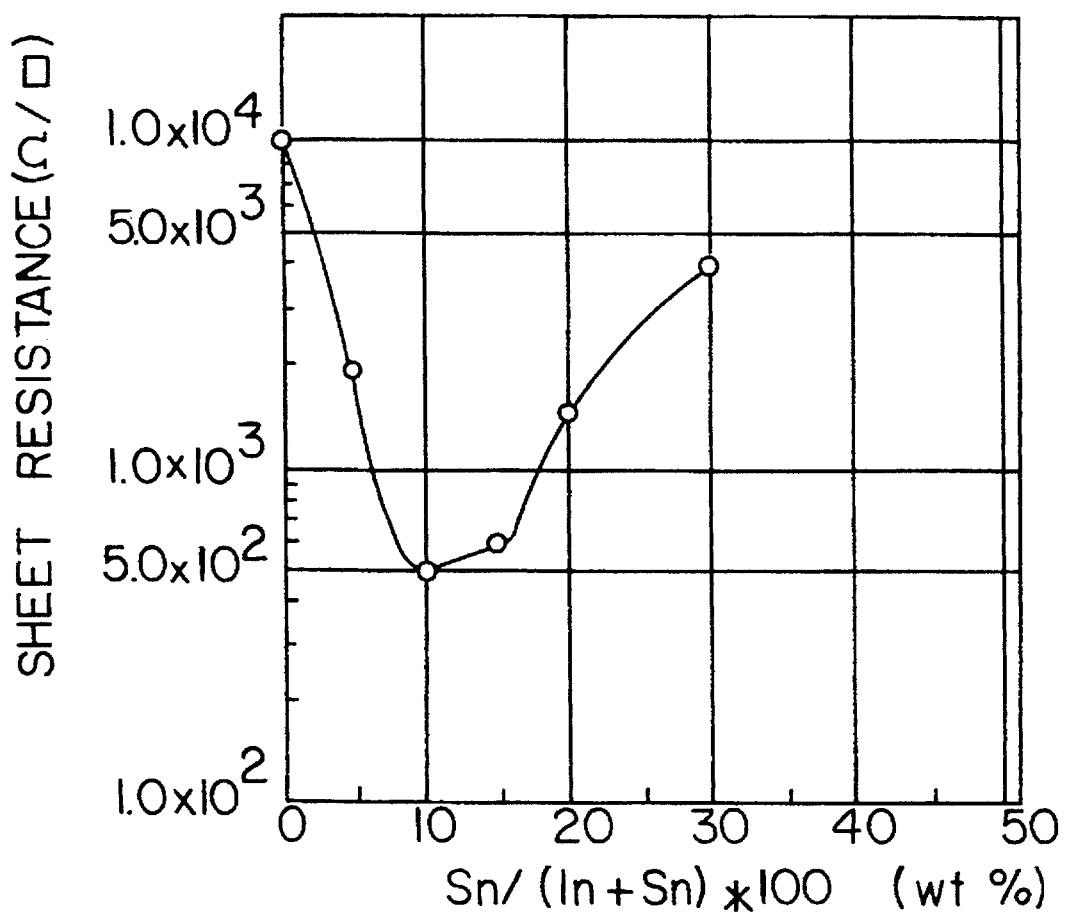
FIG.1 is a graph showing a relationship between a sheet electric resistance and a ratio Sn/(Sn+In)×100%.
Figure 2:
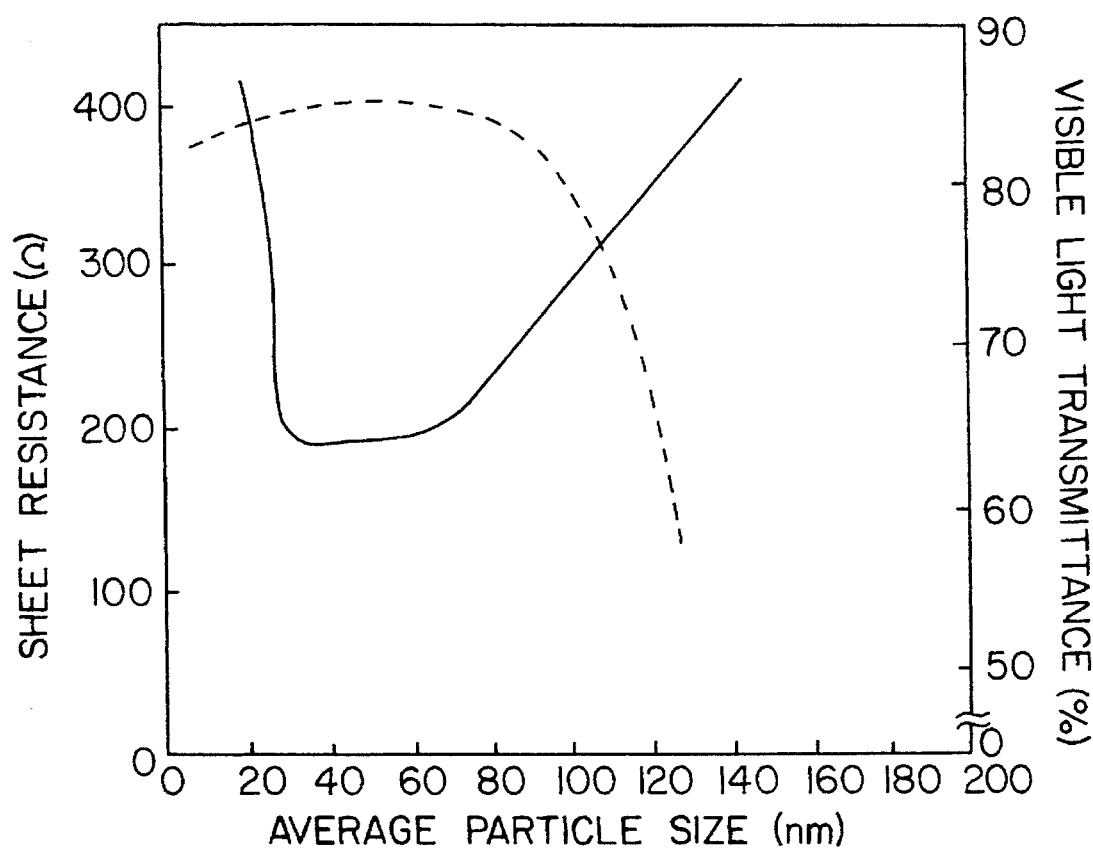
FIG.2 is a graph showing a relationship between an average particle size of a transparent and electrically conductive film, and an electrical resistance and a visible light transmittance of the film.

Referring to the accompanying drawings, the description will be directed to a preferred embodiment of a composition for use in a formation of a transparent and electrically conductive film and a method for making the film.

A composition for use in a formation of a transparent and electrically conductive film according to the present invention is synthesized in the following way:

First, inorganic indium compound InXp is mixed with an organic compound Z capable of coordinating with both of tin and indium. The inorganic indium compound may be composed of a material which has a ligand exchangeable with the organic compound capable of coordinating with indium and tin. For example, the inorganic indium compound may be composed of indium nitrate, indium sulfate or indium chloride, preferably including water of crystallization. The organic compound capable of coordinating with both of indium and tin is able to coordinate partially with indium and tin and to promote a formation of an intermediate compound of indium and tin as represented by the formula:

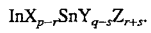

$InX_{p-r}SnY_{q-s}Z_{r+s}$.

Further, the organic compound is required to have a solubility in an organic solvent and may be composed of β-diketone group, α- or β-ketone acid group, ester group of α- or β-ketone acid group or α- or β-amino alcohol group. Examples of β-diketone group are acetyl acetone, methyl acetyl acetone, acetoacetic ethyl ester, acetyl methyl ethyl ketone, trifluoro-acetyl acetone, malonic-acid diethyl ester, dibenzoyl acetone, benzoyl methane, benzoyl-trifluoro acetone, furoyl acetone, 2-furoylbenzoyl acetone, 2-thenoyl acetone and a mixture thereof. Examples of α- or β-ketone acid groups are acetoacetic acid, propionyl butyric acid, benzoyl acetic acid, acetyl formic acid, benzoyl formic acid and the like. Examples of the ester group of α- or β-ketone acid groups are methyl, ethyl, propyl, butyl esters thereof. Examples of α- or β-amino alcohol groups are amino ethylalcohol and the like.

To the solution is added an organic solvent and an organic tin compound SnYq and the resulting solution is heated. The organic tin compound is rather stable in air but is easily hydrolyzed by heating. For example, available material as the organic tin compound is tin carboxylate or tin dicarboxylate and preferably tin formate, tin acetate or tin oxalate which has a small number of carbon atoms.

The organic solvent may be composed of a solvent capable of dissolving the organic compound and inorganic compound used in this embodiment. Available solvent is, for example, an aromatic hydrocarbon group such as toluene, xylene; alcohol group such as ethanol and isopropanol; acetic ester group such as ethyl acetate, butyl acetate; ketone group such as acetone and methylethyl ketone and diethyl ketone; ether group such as methoxyl-ethanol and ethoxyl-ethanol and tetrahydrofuran. The heating temperature of the organic solution is preferably a temperature equal to or close to a reflux temperature of the organic solution including inorganic indium compound, organic tin compound and organic compound capable of coordinating with indium and tin.

After being heated, the organic solution is cooled to a room temperature and a polyhydric alcohol is added to the solution group to form a composition for use in a formation of a transparent and electrically conductive film. The addition of polyhydric alcohol is to increase viscosity of the organic solution and to promote the stability of the resultant film obtained by applying the organic solution to the substrate, and drying. For example, possible alcohol may contain a glycol group and trivalent alcohol and is preferably ethylene glycol or glycerol which leaves hardly any residual carbon during thermal decomposition.

The composition for use in formation of transparent and electrically conductive film is applied to a substrate, dried and fired to form a resultant transparent and electrically conductive film. Available application method is a screen printing method, a roll coating method, a dip coating method and a spin coating method and preferably is a dip coating method or a spin coating method. A firing temperature is a range higher than the decomposition temperature of the composition and lower than the deformation temperature of substrate and preferably ranges from 400° to 700° C.

The following description will be directed to the preferred embodiment. However, the scope of the present invention is not limited to the preferred embodiment.

EXAMPLE 1

A mixture of 45 g of indium nitrate ($In(NO_3)_3 \cdot 3H_2O$) and 50 g of acetyl acetone is put in an 1 1 Erlenmeyer flask and stirred and dissolved at room temperature to form a solution. The solution has 0 g, 1.35 g, 2.7 g, 4.05 g, 5.4 g, and 8.1 g of stannous oxalate (tin oxalate) added thereto in order to make a tin ratio, 0, 5, 10, 15, 20 and 30 wt % in respect to Sn/(Sn+In)×100%, wherein Sn is an amount contained in stannous oxalate and In is an amount contained in indium nitrate. Further, the solution has acetone added thereto and is refluxed. Then, the solution has 10 g of glycerol added thereto and is stirred and mixed to synthesize a composition for use in a formation of a transparent and electrically conductive film. A glass plate having $SiO_2$ film applied thereto is dipped into the solution and is withdrawn at a rate of 60 cm/min from the solution. Then, the glass plate is kept at room temperature for 5 min. After being dried at 100° C. for 5 min, the film applied to the glass plate is fired at 500° C. for one hour in air to form a transparent and electrically conductive film. The resultant film is of a thickness of 0.05 micron and its electric characteristic is shown in FIG. 1.

As shown in FIG. 1, when a mixing ratio of indium nitrate to stannous oxalate is equivalent to 5 to 20 wt % of Sn/(Sn+In)×100, the film has a low electric sheet resistance (Ω/□)

EXAMPLE 2

The inorganic indium compound is composed of indium chloride ($InCl_3 \cdot 3H_2O$) and the organic tin compound is composed of stannous oxalate. A mixing ratio of indium chloride and stannous oxalate is arranged to be 10 wt % in respect to Sn/(Sn+In)×100%. Other conditions are similar to those of Example 1.

EXAMPLE 3

The organic tin compound is composed of stannous acetate ($Sn(CH_3COO)_2$). A mixing ratio of indium nitrate and stannous acetate is arranged to be 10 wt % in respect to Sn/(Sn+In)×100%. Other conditions are similar to those of Example 1.

EXAMPLE 4

The organic compound capable of coordinating with indium and tin is composed of 2-amino alcohol. Other conditions are similar to those of Example 1.

EXAMPLE 5

The polyhydric alcohol is composed of ethylene glycol. Other conditions are similar to those of Example 1.

Comparative Example 1

A mixture of 45 g of indium nitrate and 5.4 g of stannic chloride ($SnCl_4 \cdot 5H_2O$) is prepared in a way that the ratio of Sn/(Sn+In) is 10 wt % and has acetone added therein. The mixture ×100% is stirred and mixed to form a composition for use in a formation of transparent and electrically conductive film. A glass plate having $SiO_2$ film applied thereto is dipped into the composition and is withdrawn at a rate of 60 cm/min from the solution. Then, the glass plate is kept at room temperature for 5 min. After being dried at 100° C. for 5 min, the solution applied to the glass is fired at 500° C. for one hour in air to form a transparent and electrically conductive film.

Table 1 shows testing results obtained with Examples 2 to 5 and Comparative Example 1.

TABLE 11

| | Film Thickness (μm) | Sheet Resistance (Ω/□) | Transmittance (%) at 550 nm | Adhesion | surface Hardness |
| --- | --- | --- | --- | --- | --- |
| Ex. 2 | 0.05 | 500 | 87 | good | good |
| Ex. 3 | 0.05 | 550 | 87 | good | good |
| Ex. 4 | 0.06 | 400 | 86 | good | good |
| Ex. 5 | 0.04 | 600 | 88 | good | good |
| Com. 1 | 0.03 | 4000 | Cloudy | poor | poor |

In view of the above embodiment, it is clear that the composition for use in a formation of transparent and electrically conductive film and the method for forming the film according to the present invention, make it possible to manufacture the transparent and electrically conductive film easily and at a low cost and is suitable for a transparent electrode such as a display device or a heating resistor.

EXAMPLE 6

A mixture of 45 g of indium nitrate ($In(NO_3)_3 \cdot 2H_2O$) and 50 g of acetyl acetone is put in an 1 l Erlenmeyer flask and stirred and dissolved at room temperature to form a solution. The solution has 5.4 g of stannous oxalate (oxygen content of 57 at %) added thereto in order to make a tin ratio, 10 wt % in respect to Sn/(Sn+In)×100%. Further, the solution has acetone added thereto and is refluxed. Then, the solution is stirred and mixed to synthesize a composition for use in a formation of a transparent and electrically conductive film. A glass plate having $SiO_2$ film applied thereto is dipped into the solution and is withdrawn at a rate of 60 cm/min from the solution. Then, the glass plate is kept at room temperature for 5 min. After being dried at 100° C. for 5 min, the film applied to the glass plate is fired at 500° C. for one hour in $N_2$ to form a transparent and electrically conductive film.

EXAMPLE 7

The inorganic indium compound is composed of indium sulfate ($In_2(SO_4)_3 \cdot 9H_2O$) and the organic tin compound is composed of stannous oxalate. A mixing ratio of indium chloride and stannous oxalate is arranged to be 10 wt % in respect to Sn/(Sn+In)×100%. Other conditions are similar to those of Example 6.

EXAMPLE 8

The organic tin compound is composed of stannous glutarate ($SnC_5H_6O_4$) having an oxygen content of 25 at %. A mixing ratio of indium nitrate and stannous glutarate is arranged to be 10 wt % in respect to Sn/(Sn+In)×100%. Other conditions are similar to those of Example 6.

EXAMPLE 9

The organic compound capable of coordinating with indium and tin is composed of 2-aminoethylalcohol ($H_2NC_2H_5OH$). Other conditions are similar to those of Example 6.

EXAMPLE 10

The atmosphere gas is composed of argon. Other conditions are similar to those of Example 6.

Comparative Example 2

The organic tin compound is composed of stannous adipate ($SnC_6H_8O_4$) having an oxygen content of 21 at %. and is arranged to be 10 wt % in respect to Sn/(Sn+In)× 100%. Other conditions are similar to those of Comparative Example 1.

Table 2 shows testing results obtained with Examples 6 to 10 and Comparative Examples 1 and 2.

TABLE 2

| | Film Thickness (μm) | Sheet Resistance (Ω/□) | Transmittance (%) at 550 nm | Adhesion | surface Hardness |
| --- | --- | --- | --- | --- | --- |
| Ex. 6 | 0.06 | 250 | 85 | good | good |
| Ex. 7 | 0.06 | 260 | 85 | good | good |
| Ex. 8 | 0.06 | 270 | 85 | good | good |
| Ex. 9 | 0.07 | 210 | 84 | good | good |
| Ex. 10 | 0.06 | 250 | 85 | good | good |
| Com. 1 | 0.06 | 4000 | Cloudy | poor | poor |
| Com. 2 | 0.06 | 1000 | 78 | good | poor |

In view of the above embodiment, it is clear that the composition for use in a formation of transparent and electrically conductive film according to the present invention makes it possible to manufacture the transparent and electrically conductive film easily and at a low cost and is suitable for a transparent electrode such as a display device or a heating resistor.

EXAMPLE 11

A mixture of 45 g of indium nitrate ($In(NO_3)_3 \cdot 3H_2O$) and 50 g of acetyl acetone is put in an 1 l Erlenmeyer flask and stirred and dissolved at room temperature to form a solution. The solution has 5.4 g of stannous oxalate ($SNC_2O_4$) added thereto in order to make a tin ratio to 10 wt % in respect to Sn/(Sn+In)×100%. Further, the solution has acetone added thereto and is refluxed. After reflux, the solution is cooled to a room temperature. Then, 0.1 g of hydrogen peroxide is added thereto and the solution is stirred and mixed to synthesize a composition for use in a formation of a transparent and electrically conductive film. A glass plate having $SiO_2$ film applied thereto is dipped into the solution and is withdrawn at a rate of 60 cm/min from the solution. Then, the glass plate is kept at room temperature for 5 min. After being dried at 100° C. for 5 min, the film applied to the glass plate is fired at 500° C. for one hour in air to form a transparent and electrically conductive film. The resultant film is of a thickness of 0.05 micron.

EXAMPLE 12

The inorganic indium compound is composed of indium chloride ($InCl_3 \cdot 3H_2O$) and the organic tin compound is composed of stannous oxalate. A mixing ratio of indium chloride and stannous oxalate is arranged to be 10 wt % in respect to $Sn/(Sn+In) \times 100\%$. Other conditions are similar to those of Example 11.

EXAMPLE 13

The organic tin compound is composed of stannous acetate ($Sn(CH_3COO)_2$). A mixing ratio of indium nitrate and stannous acetate is arranged to be 10 wt % in respect to $Sn/(Sn+In) \times 100\%$. Other conditions are similar to those of Example 11.

EXAMPLE 14

The organic compound capable of coordinating with indium and tin is composed of 2-amino alcohol. Other conditions are similar to those of Example 11.

EXAMPLE 15

The catalyzer for thermal decomposition is composed of 1 g of tri-nitrotoluene. Other conditions are similar to those of Example 11.

Table 3 shows testing results obtained with Examples 11 to 15 and Comparative Example 1.

TABLE 3

| | Film Thickness (μm) | Sheet Resistance (Ω/□) | Transmittance (%) at 550 nm | Adhesion | surface Hardness |
|---|---|---|---|---|---|
| Ex. 11 | 0.03 | 660 | 88 | good | good |
| Ex. 12 | 0.03 | 700 | 88 | good | good |
| Ex. 13 | 0.03 | 720 | 88 | good | good |
| Ex. 14 | 0.04 | 520 | 87 | good | good |
| Ex. 15 | 0.04 | 500 | 87 | good | good |
| Com. 1 | 0.03 | 4000 | Cloudy | poor | poor |

In view of the above embodiment, it is clear that the composition for use in a formation of transparent and electrically conductive film according to the present invention makes it possible to manufacture a film the superior in electrical conductivity and transparency in a visible light region easily and at a low cost and is suitable for a transparent electrode such as a display device or a heating resistor.

EXAMPLE 16

A mixture of 60 g of indium nitrate ($In(NO_3)_3 \cdot 3H_2O$) and 50 g of acetyl acetone is put in an 1 l Erlenmeyer flask and stirred and dissolved at room temperature to form a solution. The solution has 10 g of stannous oxalate ($SnC_2O_4$) and acetone added thereto and is refluxed. Then, the solution has 10 g of glycerol added thereto and is stirred and mixed to synthesize a composition for use in a formation of a transparent and electrically conductive film. A glass plate having $SiO_2$ film applied thereto is dipped into the solution and is withdrawn at a rate of 60 cm/min from the solution. Then, the glass plate is kept at room temperature for 5 min. After being dried at 100° C. for 5 min, the film applied to the glass plate is sintered at 500° C. under a pressurized steam atmosphere for one hour in air to form a transparent and electrically conductive film. The temperature rising speed is 20° C./min. The resultant film is of a thickness of 0.07 micron.

EXAMPLE 17

The method of Example 16 is carried out at the rising speed of 30° C./min.

EXAMPLE 18

The method of Example 16 is carried out at the rising speed of 50° C./min.

Comparative Example 3

A mixture of 50 g of indium nitrate, 6.0 g of stannic chloride ($SnCl_4 \cdot 5H_2O$) and acetone is stirred and mixed to form a composition for use in a formation of transparent and electrically conductive film. A glass plate having $SiO_2$ film applied thereto is dipped into the composition and is withdrawn at a rate of 60 cm/min from the solution. Then, the glass plate is kept at room temperature for 5 min. After being dried at 100° C. for 5 min, the solution applied to the glass is fired at 500° C. for one hour in air to form a transparent and electrically conductive film.

Table 4 shows testing results obtained with Examples 16 to 18 and Comparative Example 3.

TABLE 4

| | Film Thickness (μm) | Sheet Resistance (Ω/□) | Transmittance (%) at 550 nm | Average particle size (nm) | Adhesion |
|---|---|---|---|---|---|
| Ex. 16 | 0.07 | 200 | 85 | 30 | good |
| Ex. 17 | 0.07 | 300 | 85 | 35 | good |
| Ex. 18 | 0.07 | 400 | 85 | 40 | good |
| Com. 3 | 0.05 | 2000 | 50 | 50 | poor |

In view of the above embodiment, it is clear that the films according to the present invention come to have a uniform size distribution of 30 to 100 nm and result in superior electrical conductance and a transparency in a visible light region, so that the film is suitable for a transparent electrode such as a display device or a heating resistor.

EXAMPLE 19

Figure 3:
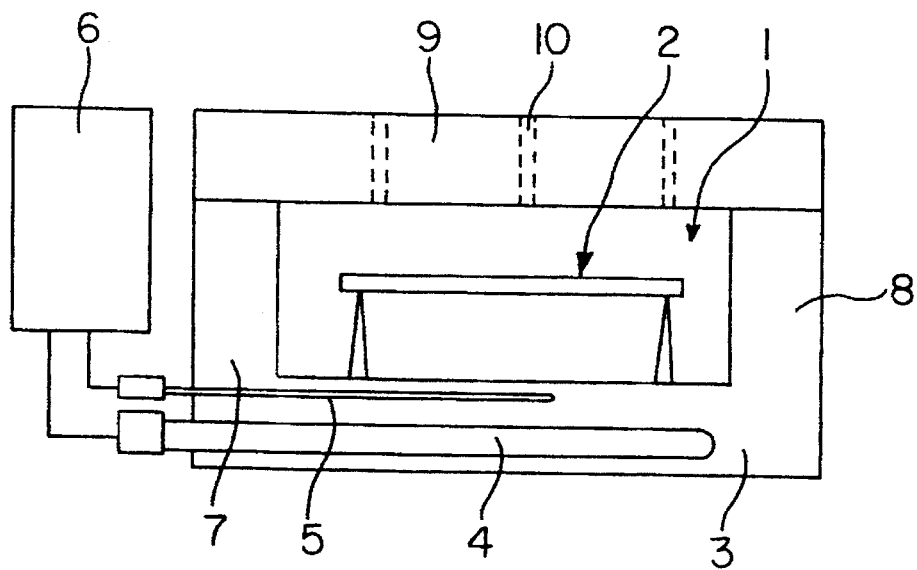
FIG.3 is a schematic diagram of an electric furnace used for carrying out a method of preparing a transparent and electrical conductive film according to the present invention.

A mixture of 45 g of indium nitrate ($In(NO_3)_3 \cdot 3H_2O$) and 50 g of acetyl acetone is put in an 1 l Erlenmeyer flask and stirred and dissolved at room temperature to form a solution. The solution has 0 to 8.1 g of stannous oxalate ($SnC_2O_4$) added thereto in order to make a tin ratio of 0 to 30 wt % in respect to $Sn/(Sn+In) \times 100\%$, wherein Sn is an amount contained in stannous oxalate and In is an amount contained in indium nitrate. Further, the solution has acetone added thereto and is refluxed. Then, the solution after reflux is cooled to a room temperature and has 10 g of glycerol added thereto and is stirred and mixed to synthesize a composition for use in a formation of a transparent and electrically conductive film. A glass plate having $SiO_2$ film applied thereto is dipped into the solution and is withdrawn at a rate of 60 cm/min from the solution. Then, the glass substrate is kept at room temperature for 5 min. After being dried at 100° C. for 5 min, the substrate 2 provided with the film is placed in a room 1 of an electric furnace as shown in FIG. 3 and is heated at a temperature rising speed of 30° C. from a room temperature to 500° C. and is kept at 500° C. for one hour in air to form a transparent and electrically conductive film.

In the example, the electric furnace is made of stainless steel having 10 mm in a thickness and a temperature sensor 5 and an electric neater 4 are provided at a bottom 3 of the electric furnace and are connected to a temperature control circuit 6 in order to control a temperature of the inner room. Any heater is not provided at sides 7 and 8 and a lid 9. The lid is provided with small holes communicating the inner room to an outer thereof, which is designed in a way to adjust a gas pressure in the furnace room 1 within 5 to 100 mmH$_2$O by means of gas generating on the thermal decomposition.

EXAMPLE 20

In the Example 19, the substrate is placed and kept for 30 minutes in a room of the electric furnace preheated at 500° C.

EXAMPLE 21

Figure 4:
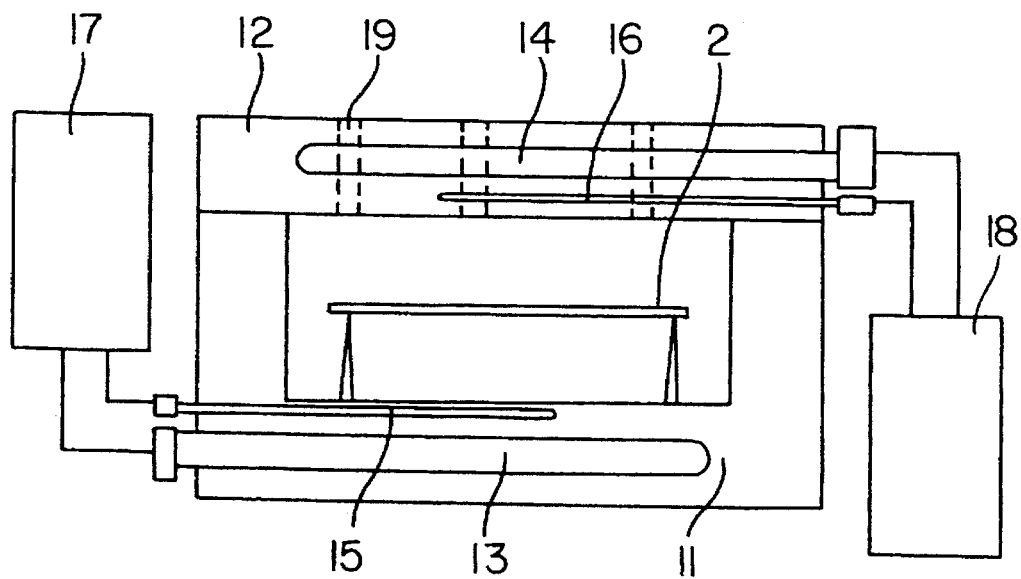
FIG.4 is a schematic diagram of another electric furnace.

As shown in FIG. 4, an electric oven similar to Example 1 is further provided with an electric heater 14 and a temperature sensor 16 at a lid 12 of the room 1, which are connected with a temperature control circuit 18. At a bottom 11 of the room, the electric heater 13 and temperature sensor 15 is provided in a similar manner to Example 1, which are connected to a temperature control circuit 17. The lid 12 has small holes 10 which communicate the inner room to an outer thereof.

In the electric furnace, temperatures of each of the furnace walls is independently controlled in a way to elevate temperatures of front and back surfaces of the substrate 2 in a same pattern.

EXAMPLE 22

Figure 5:
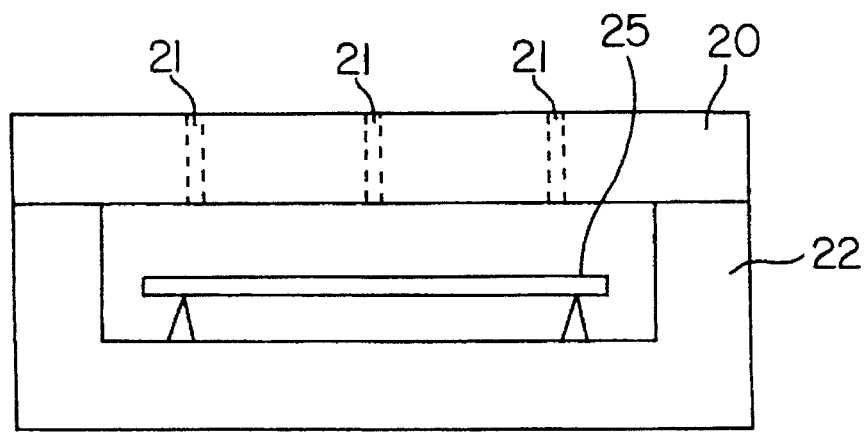
FIG.5 is a schematic diagram of a box used for providing an atmosphere for thermal decomposition.
Figure 6:
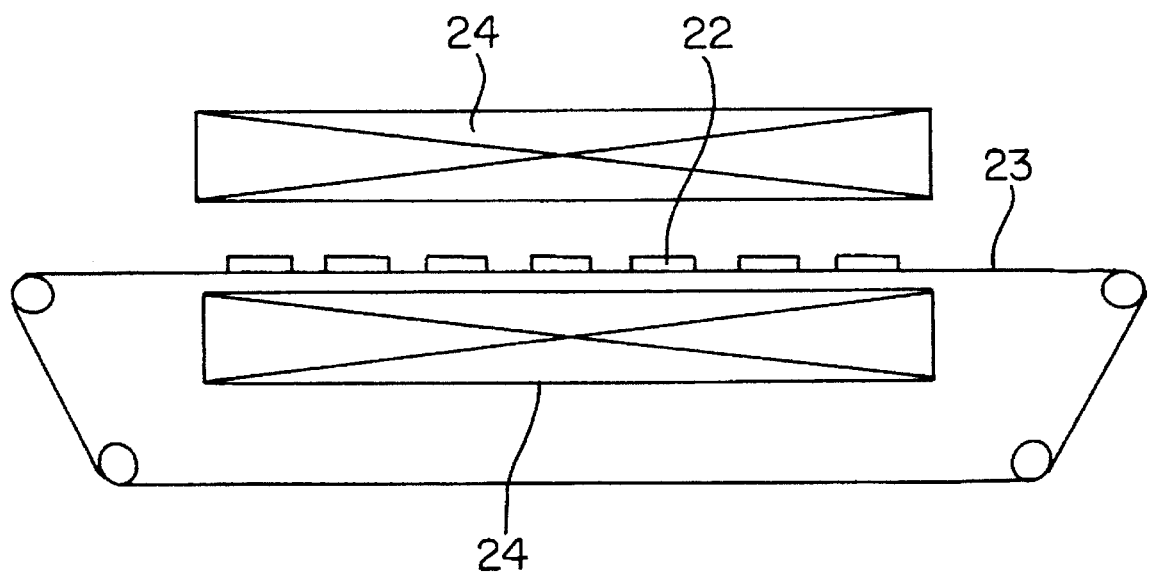
FIG.6 is a schematic diagram of a tunnel type electric furnace for heating a box of FIG.5.

As shown in FIG. 5, a substrate 25 provided with a same composition as Example 19 is placed in an aluminum box 22 provided with small holes 21 at a lid thereof, which box is continuously transferred through a tunnel type furnace and heated by a heater 24 as shown in FIG. 6. The maximum attainable temperature is 500° C. and the heating time is about 20 minutes.

EXAMPLE 23

A mixture of 45 g of indium nitrate (In(NO$_3$)$_3$·3H$_2$O) and 5.4 g of stannous chloride (SnCl$_4$·5H$_2$O) and acetone is put in an 1 l Erlenmeyer flask and stirred and mixed to form a composition for use in a formation of a transparent and electrically conductive film. A glass plate having SiO$_2$ film applied thereto is dipped into the solution and is withdrawn at a rate of 60 cm/min from the solution. Then, the glass substrate is kept at room temperature for 5 min. After being dried at 100° C. for 5 min, the substrate is subjected to a same firing treatment as Example 20.

Comparative Example 4

The same composition as Example 19 is applied on a substrate by a dipping method and the substrate is kept at 500° C. for one hour in an electric furnace wherein convective heat transfer mainly occurs, to obtain a transparent and electrical conductive film.

Comparative Example 5

The same composition as Example 23 is applied on a substrate by a dipping method and the substrate is subjected to a same treatment for thermal decomposition as the above Comparative Example 4.

Table 5 shows testing results obtained with Examples 19 to 23 and Comparative Examples 4 and 5. All films thus obtained are 50 nm in a thickness.

TABLE 5

|  | Cracking | Sheet Resistance ($\Omega/\square$) | Transmittance (%) at 550 nm | Adhesion | Difference between front and back resistance(%) |
| --- | --- | --- | --- | --- | --- |
| Ex.19 | NONE | 400 | 87 | good | 3 |
| Ex.20 | NONE | 400 | 87 | good | 3 |
| Ex.21 | NONE | 400 | 88 | good | 0 |
| Ex.22 | NONE | 400 | 88 | good | 1 |
| Ex.23 | NONE | 500 | 86 | good | 5 |
| Com.4 | SOME | 500 | 85 | normal | 10 |
| Com.5 | MANY | 4000 | Cloudy | bad | 20 |

In view of the above embodiment, it is understood that control of a reaction pressure needs the optimum gas pressure of atmosphere and it is clear that an a furnace provided with the following design conditions can realize the best mode of the thermal decomposition:

(1) that the pressure of the semi-closed atmosphere is from 5 to 100 mmH$_2$O when the thermal decomposition is going.

(2) that a ratio (V/A) between the room volume (V) of the semi-closed atmosphere and the total area (A) of the holes for discharging the decomposed gas is from 50 to 2000 cm$^3$/cm$^2$.

(3) that a ratio (B/A) between the amount (B) of the decomposed gas and the total area (A) of the holes for discharging the decomposed gas is from 100 to 10000 ml/cm$^3$.

(4) that a ratio (B/V) between the amount (B) of the decomposed gas and the room volume (v) of the semi-closed atmosphere is from 0.01 to 1000 ml/cm$^3$.

In the composition for use in a formation of a transparent and electrically conductive, it is preferable that said organic tin salt is mixed with said inorganic indium salt in a mixing ratio of 5 to 20 wt % by a definition of Sn/(Sn+In) ×100%.

In the embodiment for forming a transparent and conductive film by means of radiant heating, the pressurizing is carried out under the semi-closed atmosphere. In the place of this method, the pressurizing may be carried out at a pressure higher than atmosphere by means of pressure device. Also, the radiant heating may be carried out in an atmosphere without pressurizing. Further, the method may be carried out at a pressure higher than atmosphere by means of convective heating.

While the box for heating the composition for forming a transparent and conductive film is made of alumina in Example 22, it may be made of any other materials having a same function such as ceramics, metal, glass and the like.

While the walls of the furnace is made of stainless steel in the above Example, it may be made of ceramics and glass materials.

The method according to the embodiment of the present invention is suitable to a method for forming a transparent and conductive film on both sides of a transparent substrate such as glass substrate and the like, so that the method can be used for making a EL touch panel and the like.

While the embodiment is carried out by the radiant heating, the heating by conduction may be used for forming a transparent and conductive film on a single surface of a substrate.

Therefore, according to the present invention there is obtained a transparent and conductive film provided with no cracking, superior transmittance, much uniform characteristics, so that the resulting electrode comes to have a low resistance and a higher transmittance.

What is claimed is:

1. A composition for use in a formation of a transparent and electrically conductive film, which comprises a compound represented by the formula:

$$InX_{p-r}SnY_{q-s}Z_{r+s}$$

wherein:

InX$_p$ is an inorganic indium salt; SnY$_g$ is an organic tin salt of a dicarboxylic acid or formic acid; Z is an organic compound capable of coordinating with indium and tin, which is selected from the group consisting of β-diketone group, α- or β-ketone acid group, ester group of α- or β-ketone acid group and α- or β-amino alcohol group; and, p, q, r and s are coordination numbers.

2. The composition for use in a formation of a transparent and electrically conductive film according to claim 1, which is prepared by partial hydrolysis under heat treatment of an organic solution comprising an inorganic indium salt, an organic tin salt and an organic compound capable of coordinating with indium and tin.

3. The composition for use in a formation of a transparent and electrically conductive film according to claim 1, wherein said organic tin salt is mixed with said inorganic indium salt in a mixing ratio of 5 to 20 wt % by a definition of Sn/(Sn+In)×100%, wherein Sn is an amount contained in the organic tin salt and In is an amount contained in the inorganic indium salt.

4. The composition for use in a formation of a transparent and electrically conductive film according to claim 1, wherein said inorganic indium salt is selected from the group consisting of indium nitrate, indium sulfate and indium chloride.

5. The composition for use in a formation of a transparent and electrically conductive film according to claim 1, which further comprises a polyhydric alcohol.

6. The composition for use in a formation of a transparent and electrically conductive film according to claim 1, which further comprises a catalyzer for thermal decomposition.

7. The composition for use in a formation of a transparent and electrically conductive film according to claim 6, wherein the catalyzer is selected from the group consisting of a peroxide compound and a nitro compound.

8. A composition for use in a formation of a transparent and electrically conductive film, which consists essentially of a compound represented by the formula:

$$InX_{p-r}SnY_{q-s}Z_{r+s}$$

wherein:

InX$_p$ is an inorganic indium salt; SnY$_q$ is an organic tin salt of a dicarboxylic acid or formic acid; Z is an organic compound capable of coordinating with indium and tin, which is selected from the group consisting of β-diketone group, α- or β-ketone acid group, ester group of α- or β-ketone acid group and α- or β-amino alcohol group; and, p, q, r and s are coordination numbers.

* * * * *